Nov. 1, 1955  L. M. BUTTERFIELD  2,722,313
WEIGHT RESPONSIVE GRADING MACHINE
Filed March 3, 1954  5 Sheets-Sheet 3
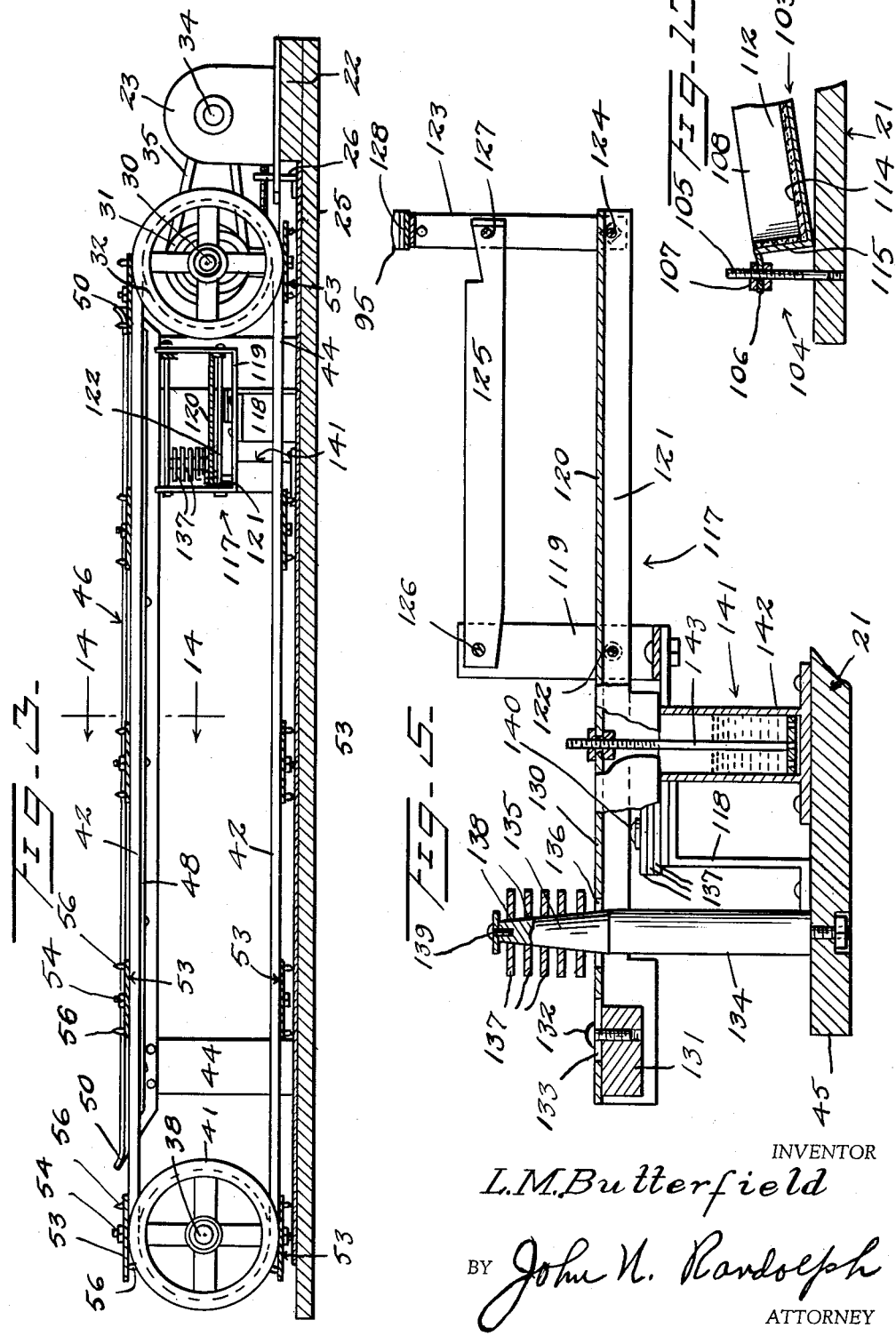
INVENTOR
L. M. Butterfield
BY John N. Randolph
ATTORNEY Nov. 1, 1955  L. M. BUTTERFIELD  2,722,313
WEIGHT RESPONSIVE GRADING MACHINE
Filed March 3, 1954  5 Sheets-Sheet 4
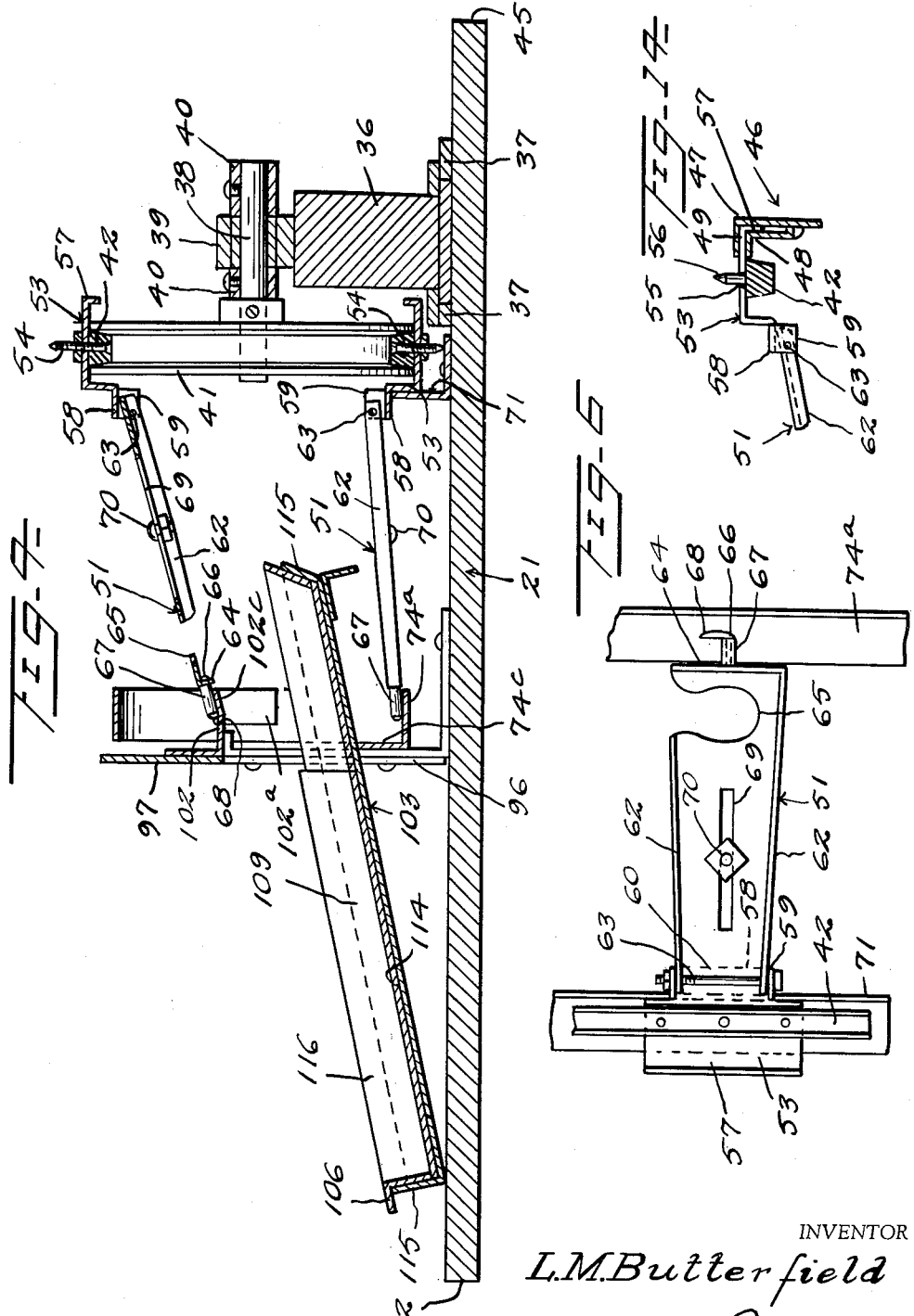
INVENTOR
L. M. Butterfield
BY John N. Randolph
ATTORNEY Nov. 1, 1955  L. M. BUTTERFIELD  2,722,313
WEIGHT RESPONSIVE GRADING MACHINE
Filed March 3, 1954  5 Sheets-Sheet 5
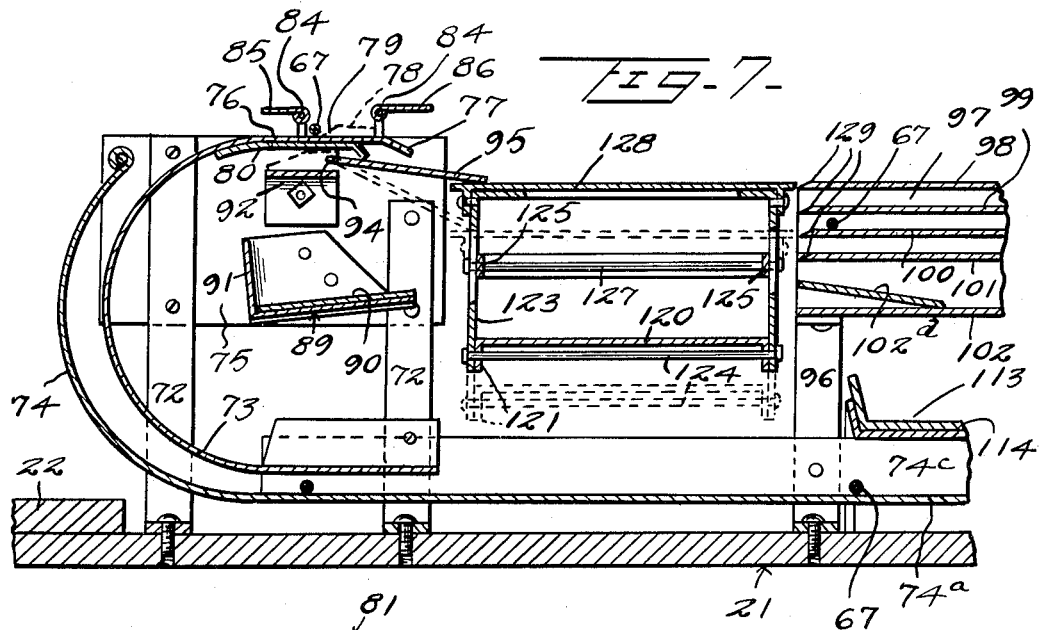
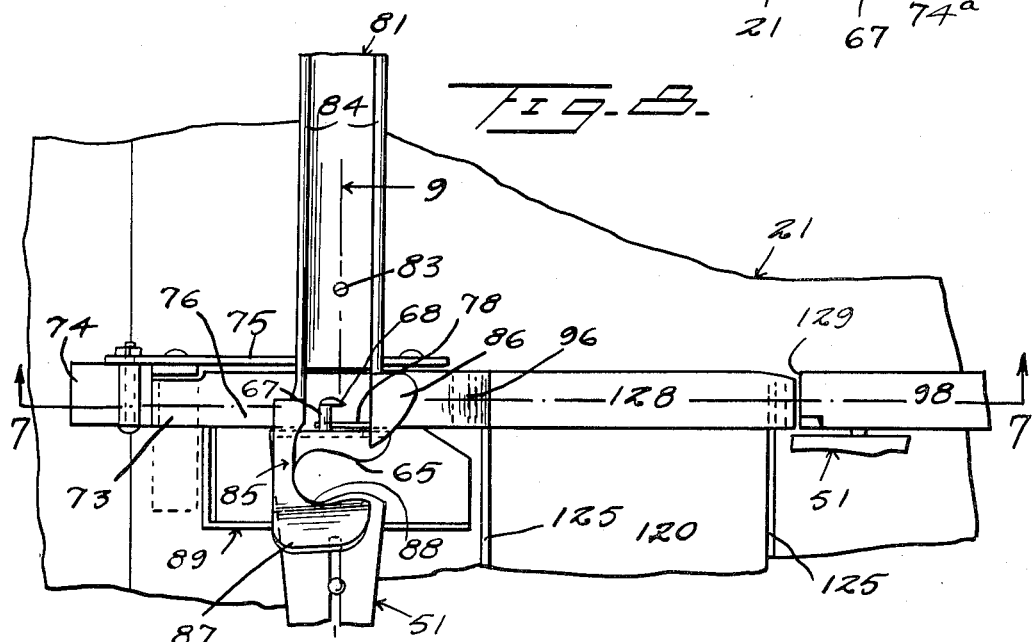
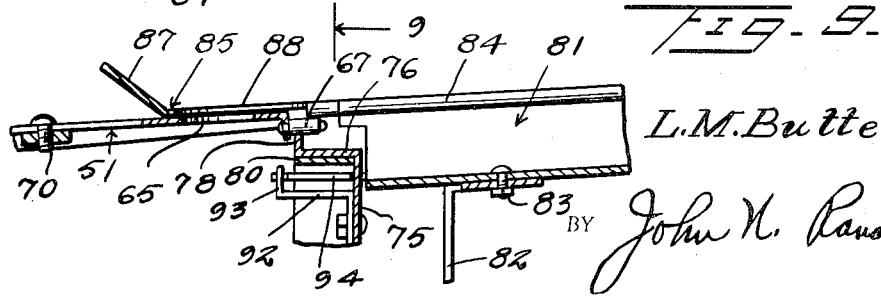
INVENTOR
L. M. Butterfield
BY John N. Randolph
ATTORNEY

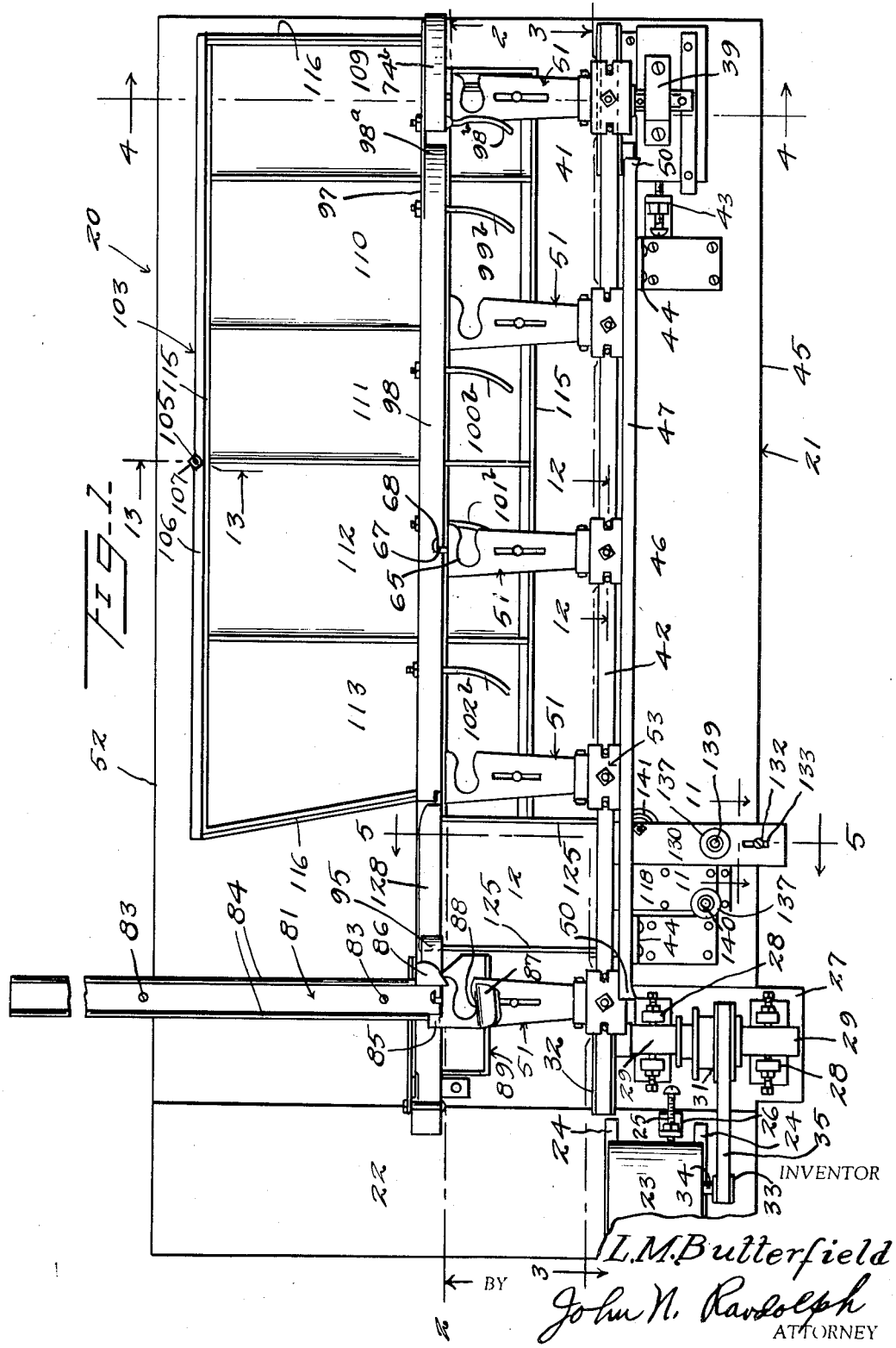

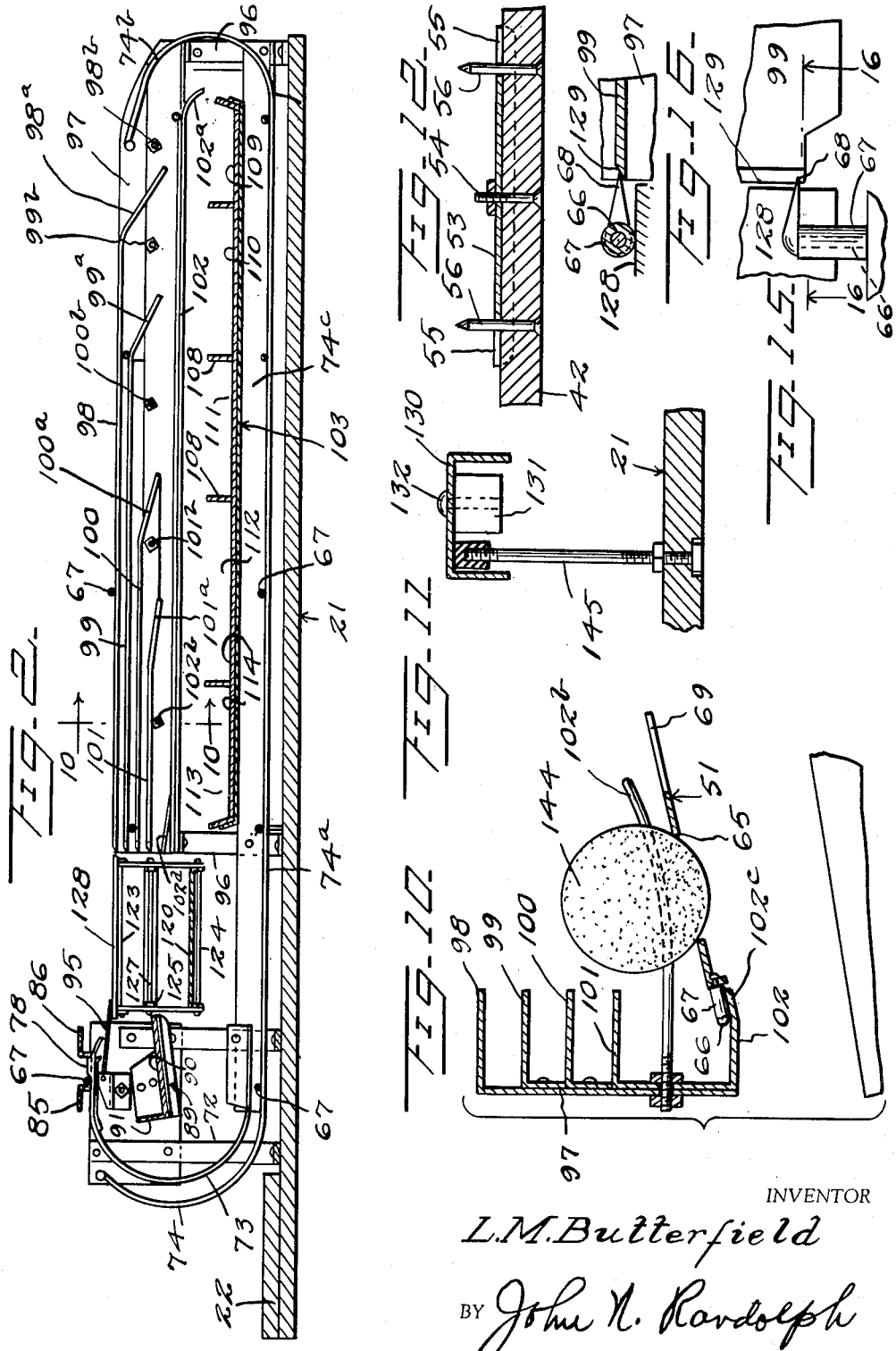

United States Patent Office 2,722,313
Patented Nov. 1, 1955

2,722,313
WEIGHT RESPONSIVE GRADING MACHINE

Louis M. Butterfield, Kittery, Maine

Application March 3, 1954, Serial No. 413,834

16 Claims. (Cl. 209—121)

This invention relates to a novel machine for grading, segregating or sorting items according to weight and has for its primary object to provide a machine of extremely simple construction utilizing a single weighing unit for grading articles of a number of different weights.

Another object of the invention is to provide a machine wherein articles of all different weights are graded by a single scale unit at one position only of the machine.

A further object of the invention is to provide a machine including an endless conveyor carrying a plurality of article supports movable along a track having a portion constituting a part of the weighing unit and which track portion is movable vertically in response to the weight of an article for positioning the carrier of said article on a selected one of a plurality of spaced track portions and from which the article is removed from the carrier for deposit into a selected bin or compartment.

A further object of the invention is to provide a machine including a novel construction of article carrier functioning in a unique manner in combination with a novel track for the carrier whereby a complete sorting or grading of articles by weight may be accomplished in a single operation.

Still a further object of the invention is to provide an improved article weighing means functioning in conjunction with the carrier and track for accurately and efficiently grading or segregating articles of a plurality of weights at a single point or station relatively to the circuit of travel of the article carriers.

Numerous other objects and advantages of the invention will hereinafter become more fully apparent from the following description of the drawings, illustrating a presently preferred embodiment thereof, and wherein:

Figure 1 is a top plan view of the machine;

Figures 2 and 3 are longitudinal sectional views thereof taken substantially along planes as indicated by the lines 2—2 and 3—3, respectively, of Figure 1;

Figure 4 is an enlarged cross sectional view taken substantially along a plane as indicated by the line 4—4 of Figure 1;

Figure 5 is an enlarged fragmentary cross sectional view taken substantially along a plane as indicated by the line 5—5 of Figure 1;

Figure 6 is an enlarged fragmentary top plan view of a bottom portion of the machine;

Figure 7 is a fragmentary longitudinal sectional view taken substantially along a plane as indicated by the line 7—7 of Figure 8;

Figure 8 is an enlarged fragmentary top plan view of a portion of the machine including the carrier loading station;

Figure 9 is a fragmentary transverse sectional view of a portion of the machine taken substantially along a plane as indicated by the line 9—9 of Figure 8;

Figure 10 is a cross sectional view taken substantially along a plane as indicated by the line 10—10 of Figure 2, on an enlarged scale and showing a portion of one of the carriers as it would appear in longitudinal section;

Figure 11 is an enlarged fragmentary sectional view taken substantially along a plane as indicated by the line 11—11 of Figure 1;

Figure 12 is an enlarged fragmentary sectional view taken substantially along a plane as indicated by the line 12—12 of Figure 1;

Figure 13 is a fragmentary vertical sectional view on an enlarged scale, taken substantially along a plane as indicated by the line 13—13 of Figure 1;

Figure 14 is an enlarged fragmentary cross sectional view taken substantially along a plane as indicated by the line 14—14 of Figure 3;

Figure 15 is an enlarged fragmentary top plan view of a portion of the machine, and Figure 16 is a fragmentary sectional view taken substantially along a plane as indicated by the line 16—16 of Figure 15.

Referring more specifically to the drawings, the weight responsive grading machine in its entirety and comprising the invention is designated generally 20 and includes an elongated base 21 having a raised portion 22 at one end thereof on which a motor 23, preferably an electric motor, is mounted adjacent one corner of the base 21. The motor 23 is suitably supported in guideways 24 for a limited sliding movement longitudinally of the base 21. The casing of the motor 23 is engaged by a screw 25 which extends threaded through a member 26 which rises from the base portion 22, so that the screw 25 may be turned in one direction for displacing the motor 23 toward the end of the base 21, adjacent which said motor is mounted, for a purpose that will hereinafter be described.

The base 21 is preferably provided with a lateral extension 27 disposed adjacent the guides 24 for supporting one of a pair of transversely aligned bearings 28. The bearings 28 support bushing members 29 in which a shaft 30, as seen in Figure 3, is journalled. A belt pulley 31 is fixed to the shaft 30 between the bushings 29 and a larger belt pulley 32 is fixed to the inner end of said shaft 30. A small belt pulley 33 is fixed to the shaft 34 of the motor 23 and an endless belt 35 is trained over the belt pulleys 33 and 31 whereby the large belt pulley 32 is driven from the motor 23. The screw 25 is adjustable for moving the motor 23 away from the shaft 30 for tensioning the belt 35.

A bearing supporting block 36 is mounted for sliding movement longitudinally on the base 21 in guides 37 and is disposed nearer the end of the base remote from the motor 23. A shaft 38 is journalled in a bearing 39 which is supported on the block 36 and is held against sliding movement by collars 40 which are secured to the shaft 38 on opposite sides of the bearing 39. A large belt pulley wheel 41, corresponding to the belt pulley 32, is secured to the inner end of the shaft 38 in longitudinal alignment with said belt pulley 32 and an endless belt 42 is trained around the grooved peripheries of said belt pulleys. A belt adjustment 43, corresponding to the belt adjustment 25, 26, engages the inner end of the block 36 for moving the pulley 41 away from the pulley 32 for tensioning the belt 42.

As seen in Figures 1 and 3, longitudinally aligned standards 44 are fixed to and rise from the base 21 between the belt 42 and an adjacent longitudinal edge 45 of the base 21. The standards 44 support an elevated track, designated generally 46, which, as best illustrated in Figure 14, includes an outer and upper section 47 and an inner and lower section 48, each of angular cross section, forming an angular guideway 49 therebetween having a horizontal inwardly opening top portion and a depending outer portion. The track 46 is disposed outwardly with respect to the upper flight of the belt 42 and the ends of the horizontal top portion of the outer and upper section 47 are flared upwardly, as seen at 50 in Figure 1.

A plurality of article supporting carriers, each designated generally 51, are connected to the belt 42 in spaced apart relationship relatively to one another longitudinally of the belt and each extends transversely from the belt 42 toward the other more remote longitudinal edge 52 of the base 21. Each carrier 51 is swingably connected to the belt 42 by a connector, designated generally 53, comprising a plate which extends across a portion on the outer side of the belt 42. Each plate or connector 53 is connected to the belt 42, as seen in Figures 1, 6, 12 and 14, by a nut and bolt fastening 54, the bolt of which extends outwardly through the belt 42 and through an intermediate portion of the plate 53. The plate 53 is provided with slots 55 which open outwardly of its leading and trailing ends. Pins or studs project outwardly from the belt 42 in alignment with the fastening 54 and said pins or studs 56 extend loosely through the slots 55 and provide a means to permit the portions of the belt 42, from which the studs 56 project, to flex away from the ends of the connector plate 53 as the belt portions 42 carrying the connector plates 53 pass around the belt pulleys 32 and 41. The studs 56 are of a sufficient length to remain in engagement with the slots 55 as the belt flexes away from the ends of the plate 53. As seen in Figure 14, each connector plate 53 has a downturned outer portion forming a longitudinally extending angular portion 57 which is disposed to enter the angular guide slot 49 of the track 46 as each plate moves away from the pulley 32 and the flared top portion 50, located adjacent the pulley 32, guides the plate portion 57 into the track or slot 49. As best seen in Figures 6 and 14, each connector plate 53 has a downwardly offset inner portion 58, when the connector plate is carried by the top flight of the belt 42, and said downwardly offset inner portion 58 has depending apertured ears 59 at the ends thereof between which an inner end 60 of the associated carrier 51 is disposed. As seen in Figure 6, each carrier 51 has side flanges 62 through which a bolt of a nut and bolt fastening 63 loosely extends. The bolt of the fastening 63 also extends through the apertures of the ears 59 for swingably mounting the carrier on the connector plate 53 for vertical swinging movement relatively to the belt 42.

The carriers 51 are preferably formed of sheet metal and are flared somewhat from their inner pivoted ends 60 to their outer ends defined by a transverse flange 64. Each carrier 51 near its outer free end is provided with a transversely elongated notch 65 which opens outwardly through one longitudinal edge and flange 62 of said carrier and in the direction of travel of the belt 42. A pin 66 is fixed to and projects outwardly from flange 64 of each carrier 51 and provides a journal for a sleeve or elongated roller 67. Each pin 66 is turned laterally beyond the outer end of its roller 67 and extends in the direction of travel of the carrier 51 and is tapered to provide a pointed pin end 68. Each carrier 51 has a longitudinally elongated slot 69 carrying a weight 70 which is adjustable in the slot longitudinally of the carrier 51. The weight 70 preferably comprises a nut and bolt which may be clamped in various adjusted positions longitudinally of the carrier.

An upright wall 71 extends longitudinally of the base 21 and has its upper edge disposed slightly above and inwardly of the lower flight of the belt 42 and is engaged by the offset portions 58 of the connector plates 53 during travel of the bottom flight of the belt 42 from the pulley 41 to the pulley 32.

Referring to Figures 2, 4, 7 and 10 the machine 20 also includes a track system disposed parallel to the tracks 46 and 71 and between said tracks and the longitudinal side edge 52 of the base 21. Said track system includes a pair of longitudinally spaced posts 72 which are fixed to and rise from the base 21 substantially in transverse alignment with the belt pulley 32 and which support an inner arcuate guide strip and track 73 and an outer arcuate track 74. The upper end of the outer track 74 is directly secured to a vertical wall or plate 75 which is in turn supported by the upper portions of the posts 72. The inner track 73 has a substantially horizontal forward portion 76 extending forwardly of the upper end of the outer track 74 and horizontally along the inner side of the upper edge of the wall 75 and which is provided with a depending free end 77 and an upturned inner edge portion 78 forming a rail and having an inclined end 79 constituting a ramp and which is disposed remote from the depending end 77 of the inner track 73. A supporting strip 80 projects from the inner side of the wall 75 and is disposed beneath and provides a support or brace for the track portion 76.

An inclined chute or runway 81 of channel shape cross section extends laterally from the outer side of the wall 75 and is demountably supported by suitable supporting members 82, one of which is illustrated in Figure 9, and which may be demountably supported on and secured to the base 21 and detachably secured to the bottom of the chute or runway 81 by fastenings 83.

The chute or runway 81 has rolled side edges forming tracks 84 on which articles roll downwardly toward the wall 75, and said tracks 84, at the inner lower end of the runway 81 are extended to partially overlie the horizontal rail portion 76. The runway 81 is disposed substantially in alignment with the raised track portion 78. As seen in Figures 8 and 9, the inner ends of the tracks 84 terminate in extensions 85 and 86 which are substantially flat. The extension 85, forming a continuation of the rear track 84, located nearest the outer rail 74, extends over and inwardly to substantially beyond the rail portion 76 and has a forwardly or transversely extending upwardly flared free end 87. The extension 86 extends only to slightly beyond the inner edge of the rail portion 76, as seen in Figure 8, and the free end thereof combines with a recessed inner portion of the extension 85 to form a pocket 88, having an open forward end.

A receptacle 89 is secured to and projects from the inner side of the wall 75 below the extensions 85 and 86 and extends forwardly to substantially beyond the extension 86 and includes an inclined bottom 90 which is inclined downwardly away from said forward end and toward a rear wall 91 of the receptacle 89.

A bracket 92 is secured to and projects from the inner side of the wall 75, between the rail portion 76 and receptacle 89, and has an inwardly offset wall portion 93. A shaft or pin 94 is supported by and between the wall 75 and wall portion 93 and provides a pivotal support for one end of an elongated strip forming a ramp 95, which extends forwardly from its pivot 94 to substantially beyond the downwardly inclined rail end 77.

A pair of longitudinally aligned posts 96 which are likewise disposed substantially in alignment with the posts 72 are fixed to and rise from the base 21 between the posts 72 and the end of the base 21, located remote from said posts. As seen in Figures 2 and 10, an elongated plate 97 extends between and is supported by the upper portions of the posts 96 and on the inner side thereof, between said posts and the belt 42. The plate 97 has a plurality of vertically spaced longitudinally extending strips formed integral therewith or fixed thereto and which project from the inner side thereof, forming a plurality of superposed rails or tracks. The uppermost track 98 extends, like the other tracks, from the end of the plate 97 located adjacent the wall 75, a distance greater than the length of all but one of the tracks disposed therebeneath and to near the other end of the plate 97. The tracks 99, 100 and 101, disposed successively beneath the upper track 98 are each of a length less than the length of the track disposed immediately thereabove. Said tracks 99, 100 and 101 have downwardly flared ends 98a, 99a, 100a and 101a, respectively, at the staggered ends thereof. The bottommost rail 102 extends along the bottom edge of the plate 97 to beyond the depending end 98a of the uppermost rail 98 and has a downwardly curved end 102a disposed beyond said rail portion 98a. The outer rail 74 includes a bottom extension 74a which extends between the adjacent posts 72 and 96 and between said posts 96 and which has an upwardly turned back end portion 74b at the end thereof disposed remote from the posts 72 and which extends around and is spaced from the downwardly curved bottom rail portion 102a and terminates above and beyond the inclined top rail portion 98a, as seen in Figure 2.

A plurality of deflector rods are fixed to and project inwardly from the wall 97 including rods 98b, 99b, 100b and 101b which are disposed beyond the downwardly inclined rail portions 98a, 99a, 100a and 101a, respectively. Another deflector rod 102b is disposed between the rails 101 and 102. As best seen in Figure 10, the bottom rail 102 has an upwardly inclined inner edge portion 102c.

A collecting receptacle, designated generally 103, is disposed between the posts 96 and has an inner longitudinal edge portion resting on and supported by an upstanding outer flange 74c of the rail portion 74a. The receptacle 103 is inclined downwardly and outwardly toward its opposite longitudinal edge which is located inwardly of and adjacent the longitudinal edge 52 of the base 21, and said last mentioned longitudinal edge of the receptacle 103 is adjustably supported above the base 21, as seen in Figure 13, by an adjustable supporting unit designated generally 104 including a threaded post 105 which is fixed to and rises from the base 21 and which extends loosely through an apertured ear 106 which forms a lateral projection of said outer longitudinal edge of the receptacle 103. Nuts 107 engage the post 105 above and below the ear 106 and are adjustable on said post for raising and lowering the outer longitudinal edge of the receptacle for varying the inclination thereof downwardly toward said outer edge. The receptacle 103 is provided with a plurality of transverse partitions 108 dividing the receptacle into a plurality of separate compartments 109, 110, 111, 112 and 113 each of which is lined with a cushioning material 114. The receptacle 103 has upstanding longitudinal side walls 115 forming end walls of said compartments and upstanding end walls 116 forming side walls of the end compartments 109 and 113. The inner elevated portion of the receptacle 103 is disposed between and spaced from the rail 102 and the rail portion 74a.

As best seen in Figures 1, 2, 3, 5 and 7, the machine 20 includes a single weighing unit, designated generally 117, which is disposed on and transversely of the base 21. The weighing unit 117 includes a bracket 118 which is fixed to and rises from the base 21 and on which is supported a U-shaped member 119. A platform 120 extends between the uprights of the U-shaped member 119 and has depending side flanges 121. A shaft or pin 122 extends loosely through portions of the flanges 121 and is supported at its ends by the uprights of the member 119 for pivotally supporting the platform 120 at a point spaced from its ends for vertical rocking movement relatively to said U-shaped member 19. The depending ends of the legs of an arch-like member 123 straddle the flanges 121 at one end of the platform 120 and are pivotally connected thereto by a pivot means 124. Links 125 extend between the upper portions of the uprights of the U-shaped member 119 and intermediate portions of the legs of the arch member 123 and are pivotally connected by pivot elements 126 and 127 to said members 119 and 123. A rail section 128 is secured to and extends longitudinally along the top surface of the arch member 123. As seen in Figure 2, the free end of the pivoted ramp 95 rests on the rail section 128 near one end thereof and the other end of said rail section is located in close proximity to the ends of the rails 98, 99, 100, 101 and 102 which are disposed adjacent the posts 72 and which constitute the entrance ends of said rails. Said entrance ends of said rails are tapered or sharpened as best illustrated in Figure 7 at 129, for a purpose which will hereinafter be described. The bottommost of these rails 102 is provided with a ramp section 102d which is inclined upwardly and toward the arch member 123 and the upper end of which is disposed beneath and spaced from the sharpened end 129 of the rail 101.

The U-shaped member 119 and the end of the bracket 118 on which it is supported are disposed between the top and bottom flights of the endless conveyor 42, as seen in Figure 3. The platform 120, at the end thereof which is disposed between the member 119, is provided with a narrow extension 130 disposed adjacent one longitudinal edge thereof and located to one side of and above the bracket 118, as seen in Figure 1. The extension 130 extends laterally beyond the longitudinal edge 45 of the base 21 and has an adjustable weight 131 near its outer end, as seen in Figure 5, which is adjustably clamped thereto by a screw 132. The screw 132 may be loosened and moved in a longitudinal slot 133 of the extension 130 for adjusting the weight 131 longitudinally of said extension. A post 134 is fixed to and rises from the base 21 and has a tapered frusto-conical upper portion 135 which extends loosely through an opening 136 of the extension 130 which is substantially larger in diameter than the post 134. A plurality of weights 137 in the form of disks having central openings 138 of different diameters are supported on the tapered post portion 135 in superimposed spaced apart relationship to one another and are retained detachably thereon by a removable stop 139 which is detachably connected to the upper end of the tapered post portion 135. Additional weights 137 may be supported by a stud 140 on a part of the bracket 118 to one side of the extension 130. A dashpot 141 is provided for cushioning rocking movement of the platform 120 and includes a cylinder containing liquid which is fixed to the base 21. Said cylinder 142 has an open top through which extends a piston rod 143 which is connected to a portion of the platform extension 130, disposed thereabove.

Before initially placing the machine 20 in operation the weights 70 are adjusted so that the carriers 51 will be of uniform weight and the weight 31 is adjusted so that the rail section 128 will support the free end of a carrier without causing the platform 120 to be rocked clockwise as seen in Figure 5, from its normal position of Figure 7, assuming that no article is supported by the carrier 51 when its roller 67 is in engagement with the track section 128. The carriers 51 are spaced a sufficient distance apart so that the weighing unit 117 can thus support only the free end of one carrier 51 at any one time. A stop 145 supported by the base 21, as seen in Figure 11, is disposed to be engaged by the extension 130 to prevent counterclockwise rocking movement of the unit 117 beyond its position of Figures 5 and 7. The motor 23 is actuated for driving the pulley 32 in a counterclockwise direction as seen in Figure 3 so that the upper flight of the belt 42 will move therefrom toward the pulley 41 while the lower flight of said belt will move from the pulley 41 toward the pulley 32.

The description of the operation of one of the carriers 51 will suffice for all. As a carrier 51 is moving toward the pulley 32, carried by the bottom flight of the belt 42, the connector plate 53 to which it is pivotally connected will be slidably engaged and supported by the rail 71, as illustrated in Figure 4, and the roller 67 of said carrier will be supported on the return rail 74a. As the connector plate 53 of said carrier passes around the pulley 32 the carrier roller 67 will travel up the outer rail 74 and as it approaches the top thereof, the carrier will rock by gravity on its pivot 63 causing its roller 67 to swing downwardly and inwardly into engagement with the inner rail 73. Said roller will thereafter travel onto the horizontal portion 76 of said inner rail 73 and toward the inclined ramp end 79 of the short rail section 78. Assuming that the machine 20 is being used for grading eggs according to weight, the eggs 144 are supplied in any suitable manner to the upper end of the rails 84 of the runway 81 along which they roll by gravity downwardly toward the extensions 85 and 86 and so that a lowermost egg will rest in the pocket 88 of said extension. Accordingly, as the carrier 51 approaches its position of Figure 8 its roller 67 will travel up the ramp 79 onto the rail section 78 thereby lifting the free end of the carrier upwardly and toward the pocket 88 which is disposed thereabove and sufficiently so that the egg contained in said pocket will be engaged by the carrier notch 65 and lifted out of engagement with the pocket 88 and conveyed through the open forward end of said pocket by the carrier 51 while it is riding on the rail section 78. Should the egg roll out of the notch 65 as it is being conveyed from the pocket 88, which occurs very infrequently, it will drop into the receptacle 89 disposed therebeneath which is lined with a suitable cushioning material to prevent breakage of the egg. Assuming that this does not occur, as the carrier with the egg supported thereby moves from left to right of Figures 7 and 8 away from the pocket 88, its roller 67 will travel down the forward end of the rail section 78 and thence downwardly over the inclined rail portion 77, from which said roller will move into engagement with the ramp 95 and roll therealong onto the rail section 128 of the weighing unit 117. The weight of the egg supported by the carrier 51 may be insufficient to rock the weighing unit about its pivot 122 from its normal raised position as illustrated in Figure 7, in which case the roller 67 of the carrier will travel along the rail section 128, thence onto the top rail 98 and therealong and down the inclined rail end 98a and after which the roller will drop onto the bottom rail 102. As the roller is traveling down the rail portion 98a the egg carried by the carrier will contact the rod 98b which will deflect the egg 144 off of the trailing longitudinal edge of the carrier 51 and into the upper end of the compartment 109 from whence the egg will roll to the lower end of said compartment.

Should the egg be slightly heavier than a minimum weight it will cause the weighing unit 117 to be rocked clockwise as seen in Figure 5 about the pivot 122 to displace the rail section 128 downwardly to below the level of the top rail 98, in which case the pointed pin end 68 will enter between the rails 98 and 99 causing the roller 67 to move off of the rail section 128 onto the rail 99 and to travel therealong and down the inclined portion 99a into engagement with the bottom rail 102, after the egg has been swept from the carrier by the rod 99b into the compartment 110. Heavier eggs will similarly cause the roller 67 to engage either the rail 100 or 101 or the ramp 102c leading to the rail 102, after which the operation previously described will be repeated and with the rods 100b, 101b or 102b, respectively, deflecting the eggs from the carrier into either the compartment 111, 112 or 113, respectively. The sharpened rail ends 129 cooperate with the pointed pin end 68 to cause the roller 67 to either ride onto or under a rail which it is approaching from the rail section 128 and eliminates the possibility of the roller striking against a rail end 129, as clearly illustrated in Figures 15 and 16.

The weighing unit 117 is unique in that only the single weighing unit is required to weigh eggs or other articles of any desired weight variations and for segregating or grading the eggs into as many classes as desired and without requiring additional weighing units or additional weighing stations. The segregation of eggs of a plurality of weights at a single station and by a single weighing unit is accomplished due to the unique arrangement of the weights 137 and their mounting, as illustrated in Figure 5. As the weighing unit 117 is rocked clockwise as seen in Figure 5 about its pivot 122 the platform extension 130 swings upwardly initially picking up the bottom weight 137 from the tapered post portion 135 so that said weight is then supported by the extension 130. If this weight is insufficient to counterbalance the weight of the egg, the extension 130 will continue to rock upwardly to similarly pick up the next weight 137 and so on. A slight rocking movement of the weighing unit will cause the roller to move into engagement with the rail 99, more movement, sufficient to pick up the bottom weight 137, will result in the roller moving into engagement with the rail 100, a still greater rocking movement sufficient to pick up the next weight 137 will cause the roller to engage the rail 101 and so forth. Obviously, the number of weights 137 may be varied depending upon the number of rails provided along the plate 97. The dashpot 141 will dampen and cushion rocking movement of the unit 117 to avoid sudden movement thereof in either direction.

After an egg has been swept from the carrier 51 and its roller is in engagement with the bottom rail portion 102c, as seen in Figure 10, the roller 67 will travel therealong onto and down the inclined end 102a and as the connector plate 53 of said carrier is moving around the pulley 41. The carier 51 will be substantially inverted as its roller moves out of engagement with the rail portion 102a, and will swing outwardly and downwardly so that the roller 67 will then move into engagement with the lower part of the bottom rail portion 74b and will ride therefrom onto the rail portion 74a along which the roller will travel for supporting the carrier in an inverted position during its movement back into engagement with the outer rail portion 74, and as previously described. Obviously, the operation of each of the other carriers will correspond to the operation of the carrier just previously described.

Various modifications and changes are contemplated and may obviously be resorted to, without departing from the spirit or scope of the invention as hereinafter defined by the appended claims.

I claim as my invention:

1. A machine for grading articles by weight comprising a driven endless conveyor having a top flight and a bottom flight, a plurality of elongated article carriers, connector means individual to said carriers connected to said endless conveyor in spaced relationship to one another, means swingably connecting said carriers to the connector means at corresponding ends of the carriers for swinging movement of the carriers in planes disposed transversely to the plane of the endless conveyor, said carriers extending transversely from one side of the endless conveyor, a rail system disposed substantially parallel to said endless conveyor and laterally spaced therefrom, said carriers having free end portions engaging on portions of the rail system and supported thereby throughout the complete circuit of movement of the carriers, each of said carriers having an article supporting portion adjacent its free end, a recessed member defining an article loading station disposed above a top portion of the rail system nearer one end thereof and beneath which the article supporting portions of the carriers are consecutively movable for each picking up and conveying an article to be graded from the article loading station toward the other remote end of the upper portion of the rail system, a tiltable weighing unit disposed transversely of said endless conveyor and rail system and pivotally mounted for vertical rocking movement about an axis spaced from the ends thereof, said weighing unit having an end portion defining a track section interposed in and constituting a part of the top portion of the rail system and located adjacent said loading station and in the direction of travel of the carriers therefrom and on which the free ends of the carriers are supported during a part of their travel toward said remote end of the rail system, said top portion of the rail system including a plurality of vertically spaced rail elements extending from said weighing unit toward said remote end of the rail system for selectively receiving the free ends of the carriers from said track section of the weighing unit, depending upon the extent that the end of the weighing unit provided with said track section is caused to swing downwardly by the weight of an article supported by the carrier, means individual to the rail elements for sweeping the articles supported by the carrier therefrom at longitudinally spaced points relatively to the rail system, and bin means individual to said rail elements for selectively receiving the articles swept from the carriers by said last mentioned means for grading the articles by weight.

2. A machine for grading articles by weight as in claim 1, said weighing unit including a plurality of separate weights, means supporting said weights in positions to be successively picked up by elevation of the other end portion of said weighing unit when the track portion thereof is displaced downwardly by the weight of a carrier and an article supported by the carrier.

3. A machine for grading articles by weight as in claim 2, and dashpot means forming a part of said weighing unit for dampening and cushioning rocking movement thereof.

4. A machine for grading articles by weight as in claim 1, feans swingably supporting said track section relatively to said end of the tiltable part of the weighing unit, and link means connected to said last mentioned means for causing said track section to move upwardly and downwardly in the plane of said rail system and selectively into vertical alignment with said vertically spaced rail elements.

5. A machine for grading articles by weight as in claim 1, and weights adjustably supported by said carriers for equalizing the weight of the unloaded carriers.

6. A machine for grading articles by weight as in claim 5, and a counterbalance weight adjustably supported by the end of the tiltable part disposed remote from said track section for counterbalancing the weight of the unloaded carriers.

7. A machine for grading articles by weight as in claim 1, the longitudinal axes of said carriers being spaced apart relatively to one another a distance greater than the length of said track section of the weighing unit.

8. A machine for grading articles by weight as in claim 1, and a ramp portion constituting a part of said rail system and disposed beneath said loading station and engaged by each of the carriers for elevating the free end of each carrier beneath the loading station for lifting and removing an article to be weighed and conveyed therefrom.

9. A machine for grading articles by weight as in claim 8, and a pivotally mounted vertically swingable ramp forming a part of said rail system having a pivoted end located adjacent said ramp portion and a free end slidably engaging on said track section over which the free end of each carrier is movable from the loading station onto said weighing unit.

10. A machine for grading articles by weight as in claim 1, and means for conveying the articles by gravity successively to the weighing station comprising a runway having a lower end connected to the weighing station.

11. A machine for grading articles by weight as in claim 1, said bin means being disposed at an incline and having upper ends disposed to receive the articles from said carriers, and means for vertically adjusting the lower end of said bin means for varying the incline thereof.

12. A machine for grading articles by weights as in claim 1, and tracks forming guide means engaging said connector means and preventing movement of the connector means except in directions corresponding to the directions of travel of the flights of said endless conveyor.

13. A machine for grading articles by weight comprising a driven endless conveyor having a top flight and a bottom flight, a plurality of elongated article carriers extending transversely from one side of said endless conveyor, means pivotally mounting said carriers at corresponding ends thereof for swinging movement in planes normal to the plane of the endless conveyor, a rail system laterally spaced from and disposed substantially parallel to the endless conveyor, said carriers having free end portions engaging and supported by portions of the rail system during the complete circuit of travel of the carriers with the endless conveyor, said rail system including a top portion, a vertically movable rail section forming a part of said top portion of the rail system and disposed near one end thereof, a single weighing unit supporting said rail section and permitting downward yielding movement thereof, an article loading station disposed above the top portion of the rail system on the approach side of said rail section and beneath which article supporting portions of the carriers are successively movable for picking up and conveying articles from said loading station, the top portion of said rail system including vertically spaced rail elements extending from the other exit end of said rail section toward the other remote end of the rail system, said rail section being displaced downwardly different distances by the free ends of the carriers traveling thereover depending upon the weight of the articles supported thereby for causing the free ends of the carriers to travel from said rail section onto different ones of the vertically spaced rail elements, means individual to said rail elements disposed in longitudinally spaced relationship to one another relatively to the rail system for dislodging the articles from the carriers during movement of the carriers along the rail elements, and sorting bins disposed beneath said rail elements including a bin individual to each rail element for receiving the articles from the carriers supported thereby.

14. A machine for grading articles by weight as in claim 13, said free end portions of the carriers comprising rollers for engaging the rail portions.

15. A machine for grading articles by weight as in claim 14, and pointed elements extending from the outer ends of said rollers in the direction of travel of the carriers for guiding the rollers selectively into engagement with the different rail elements.

16. A machine for grading articles by weight as in claim 13, said weighing unit including counterbalancing elements successively brought into operative relationship to the weighing unit by a downward displacement of said rail section for periodically increasing the resistance to downward displacement of the rail section as it assumes positions coplanar to the different rail elements during its downward displacement.

References Cited in the file of this patent
UNITED STATES PATENTS

| | | |
|---|---|---|
| 847,230 | Brockt | Mar. 12, 1907 |
| 1,169,467 | Cutler | Jan. 25, 1916 |
| 1,614,630 | Petin | Jan. 18, 1927 |
| 1,891,807 | Frost | Dec. 20, 1932 |
| 1,913,042 | Redlinger | Jan. 6, 1933 |
| 1,958,173 | Rennie | May 8, 1934 |
| 2,178,203 | Fausel | Oct. 31, 1939 |
| 2,625,266 | Voller | Jan. 13, 1953 |

FOREIGN PATENTS

| | | |
|---|---|---|
| 347,166 | Great Britain | Apr. 23, 1931 |